United States Patent
Herman et al.

(10) Patent No.: US 7,467,211 B1
(45) Date of Patent: Dec. 16, 2008

(54) REMOTE COMPUTER SYSTEM MANAGEMENT THROUGH AN FTP INTERNET CONNECTION

(75) Inventors: Shane Herman, Austin, TX (US); Mahesh Walavalkar, Sunnyvale, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/420,208

(22) Filed: Oct. 18, 1999

(51) Int. Cl.
*G06F 15/16* (2006.01)
*G06F 15/173* (2006.01)

(52) U.S. Cl. ................. 709/229; 709/217; 709/219; 709/225

(58) Field of Classification Search ......... 709/245, 709/231, 203, 221, 217–219, 227–228, 229, 709/255, 225
See application file for complete search history.

(56) References Cited

U.S. PATENT DOCUMENTS

| | | | | |
|---|---|---|---|---|
| 5,941,947 | A * | 8/1999 | Brown et al. ............. | 709/225 |
| 6,023,698 | A * | 2/2000 | Lavey et al. ............. | 707/10 |
| 6,058,399 | A * | 5/2000 | Morag et al. ............. | 707/201 |
| 6,092,196 | A * | 7/2000 | Reiche ..................... | 709/229 |
| 6,094,684 | A * | 7/2000 | Pallmann .................. | 709/227 |
| 6,182,086 | B1 * | 1/2001 | Lomet et al. ............. | 707/202 |
| 6,182,141 | B1 * | 1/2001 | Blum et al. ............... | 709/227 |
| 6,212,558 | B1 * | 4/2001 | Antur et al. .............. | 709/221 |
| 6,253,248 | B1 * | 6/2001 | Nakai et al. .............. | 709/237 |
| 6,282,575 | B1 * | 8/2001 | Lin et al. .................. | 709/244 |
| 6,324,582 | B1 * | 11/2001 | Sridhar et al. ............. | 709/228 |
| 6,332,163 | B1 * | 12/2001 | Bowman-Amuah ........ | 709/231 |
| 6,345,307 | B1 * | 2/2002 | Booth ....................... | 709/247 |
| 6,401,239 | B1 * | 6/2002 | Miron ....................... | 707/203 |
| 6,606,708 | B1 * | 8/2003 | Devine et al. ............. | 726/8 |
| 7,287,271 | B1 * | 10/2007 | Riggins .................... | 726/3 |
| 2003/0115324 | A1 * | 6/2003 | Blumenau et al. ......... | 709/225 |

(Continued)

OTHER PUBLICATIONS

U.S. Appl. No. 60/131,807.*

(Continued)

*Primary Examiner*—Rachna Desai
*Assistant Examiner*—Chau Nguyen
(74) *Attorney, Agent, or Firm*—Stolowitz Ford Cowger LLP (57) ABSTRACT

A method for remote computer systems management through an FTP Internet connection. A user operating on a remote client issues requests to the host server. These requests are first sent to an FTP server which enforces security measures. Upon authentication, the FTP server issues appropriate commands and then passes these commands on to the operation system of the host server through an FTP transfer. The commands perform standard features of the operation system which are not normally allowable by traditional FTP. Responses are sent back through the FTP server to the original requestor's remote client computer. A web-based management application may be used to provide an intuitive, user-friendly graphical user interface to be operated in conjunction with a web browser on the local client computer. The user submits requests through this web control panel to initiate operations to be executed on the remote operating system of the host server. These HTTP web requests are initially transmitted to a web server a which processes the HTTP requests and then submits the requests to the FTP server by establishing an IP connection. Likewise, responses sent back through the FTP server are passed on to the web server and reported to the user through HTML over HTTP to the original user's web browser for display.

12 Claims, 6 Drawing Sheets

U.S. PATENT DOCUMENTS

2003/0191970 A1* 10/2003 Devine et al. .............. 713/201
2008/0066173 A1* 3/2008 Moran et al. ................ 709/203

OTHER PUBLICATIONS

Reed et al. from Naval Research Laboratory, Proxies for Anonymous Routing, Computer Security Application Conference, 1996., 12th Annual, Dec. 9-13, 1996, pp. 95-104.*

Thomas Narten and Raj Yavatkar, "Remote Memory as a Resource in Distributed Systems", Workshop Operating System, 1992, Proceedings, Workshop on Apr. 23-24, 1992, IEEE Database, pp. 132-136.*

Chooi-Tian (Alex) Lee and J.W. Harris, Designing a Virtual Access Control Configuration Protocol for Implementation over iSDN and Shared-Media Networks, Local Computer Networks, 1996, Proceedings 21st IEEE Conference on Oct. 13-16, 1996, pp. 116-125.*

* cited by examiner

REMOTE COMPUTER SYSTEM MANAGEMENT THROUGH AN FTP INTERNET CONNECTION

FIELD OF THE INVENTION

The present invention relates to a method for providing remote computer system management through an FTP Internet connection.

BACKGROUND OF THE INVENTION

The Internet is a general purpose, public, global computer network which allows computers hooked into the Internet to communicate and exchange digital data with other computers also on the Internet. Once a computer is coupled to the Internet, a wide variety of options become available. Some of the myriad functions possible over the Internet include sending and receiving electronic mail (e-mail) messages, logging into and participating in live discussions, playing games in real-time, viewing pictures, watching streaming video, listening to music, going shopping on-line, browsing different web sites, downloading and/or uploading files, etc.

The most popular way of participating in the Internet involves a client/server arrangement. Basically, a server computer provides a service and acts as a host to any number of client computers wishing to avail themselves of that service. For instance, a user may wish to send an e-mail message to a friend. The user first logs his or her client computer, such as a personal computer (PC) on the Internet through a standard telephone modem, cable modem, digital subscriber line (DSL), etc. The user then composes the e-mail message on the client computer which then contacts and transmits the message over the Internet to a designated e-mail server computer. Subsequently, when the recipient checks for any new e-mail messages, the recipient's client computer will contact the e-mail server. The e-mail server will then proceed to send the new e-mail message to the recipient's client computer, again over the Internet. In many cases, a server simply contains content information (e.g., web pages displaying text and/or pictures, real-time stock quotes, etc.). A huge number of clients can access this content information via the Internet.

Figure 1:
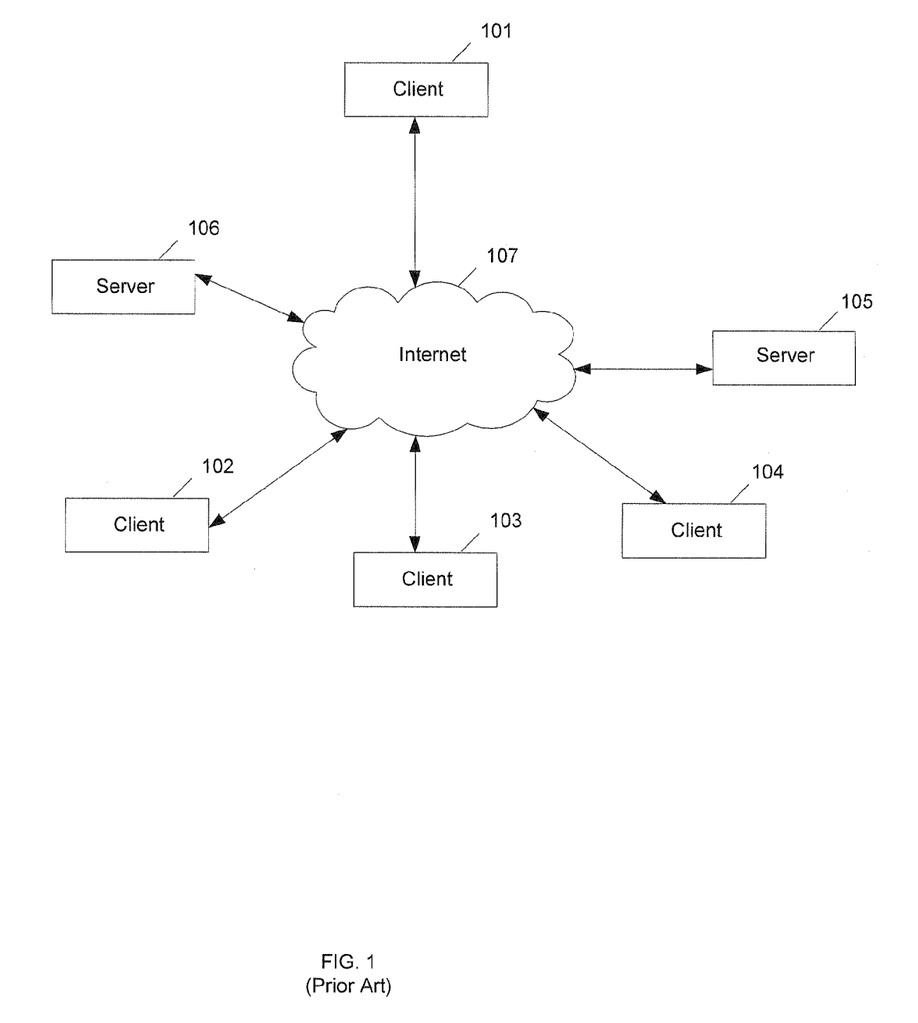
FIG. 1 shows a typical Internet client/server system.

Referring to FIG. 1, a typical Internet client/server arrangement is shown. In this example, four clients 101-104 and two servers 105-106 are shown coupled to Internet 107. In general, clients 101-104 are personal computers (PC's), whereas servers 105-106 are more powerful computers with greater hardware, software, and connection resources. Any of the clients 101-104 can transmit and receive data to/from any of the servers 105-106 via Internet 107. Moreover, a single server can handle multiple client requests at the same time. Expanding upon this client/server arrangement, millions upon millions of client and server computers around the world are coupled to the vast Internet and are exchanging information, at any given time.

Presently, there are two major protocols used to establish and facilitate data transmissions between clients and servers. These protocols specify a set of technical rules by which client and server programs can communicate with one another. The first protocol is commonly referred to by its acronym, HTTP (Hypertext Transfer Protocol). HTTP is used to transfer data between servers and clients via a browser program (e.g., Navigator or Explorer) over a part of the Internet known as the World Wide Web or "the Web." HTTP enables a user to simply place a cursor on a displayed hypertext link and click on it. This automatically takes the user to the appropriate web page, to other desired information, or to another resource located on the same or different server on the Internet.

The other widely adopted protocol is known as FTP (File Transfer Protocol). FTP enables users to readily transfer files between computers over the Internet. A file is a collection of data (e.g., e-mail messages, web pages, pictures, documents, computer programs, etc.) which is stored under a given name. FTP allows a client computer to download designated files from a server and also to upload files to a server. For example, a user can design and create a web site on a local client computer, store the web pages in one or more files, and then upload these files via FTP to a web server over the Internet. These files are stored on the server and potentially anyone can now access that web page over the Internet. Thereby, FTP servers enable the distribution of software programs and other files over the Internet.

Although HTTP and FTP confer great flexibility, ease of use, and functionality to users, there are several associated drawbacks which must still be addressed. One major headache and expense involves the administration, management, and general maintenance of the servers. Ideally, the files or content stored on the servers should be secured against unauthorized users. Furthermore, whereas some users are granted permission to access the content, they should be prevented from accidentally or intentionally corrupting or otherwise altering the content stored on the servers. At the same time, legitimate owners of the content should be given permission to update or change their content as needed. It is a rather difficult task to monitor and enforce this delicate balance, especially in light of unauthorized users who attempt to crack or hack their way into secure servers. Moreover, in order to leverage the power of most server systems, a single server is often used to support an environment whereby multiple, independent file systems exist. In effect, many different users can share a single server. This necessarily entails setting up multiple accounts one account per user. Creating multiple accounts opens up the server system to more potential abuses by unauthorized persons.

On the one hand, server systems administrators want to grant legitimate users the ability of performing certain useful commands for administering their own virtual file systems within the server. Otherwise, the administrators themselves are faced with the overwhelming workload of having to manually and directly perform a myriad of trivial tasks for legitimate users who wish to deploy content and applications onto these servers. But on the other hand, server systems administrators would like to deny direct operating-system level access to remote clients in order to minimize security risks and to also minimize security administration overhead.

Another related problem pertains to the fact that HTTP and FTP were designed to meet different needs. As such, these two protocols are used independently. However, with the explosion of e-commerce over the Internet, it is becoming ever more prevalent for users to utilize both protocols. For instance, rather than selling software through traditional shrink wrap packages at stores, it is becoming more cost efficient to purchase and sell software over the Internet. A customer can use a search engine to find the various sites which are offering the software product for sale. The customer can readily access these sites via HTTP to shop for the best bargain. The customer can then place an order over the Internet via HTTP. After verifying payment, the software program is then downloaded from the server to the buyer's client computer via an FTP file transfer. For the casual computer user, it may be a bit too daunting to master proficiency in both HTTP and FTP required to complete an e-commerce transaction. Furthermore, traditional businesses may have a difficult time finding the HTTP and FTP expertise necessary for transitioning into a more competitive e-commerce offering.

Thus, there is a need in the prior art for a method which removes some of the administrative burden of managing servers. There also exists a need in the prior art for improving the integrity of server systems. It would also be preferable if such a method could also somehow simplify the HTTP/FTP process inherent in e-commerce transactions. The present invention proposes a unique, novel, and elegant solution which satisfies all the above needs.

SUMMARY OF THE INVENTION

The present invention pertains to a method for remote computer systems management through an FTP Internet connection. In one embodiment, a user operating on a remote client issues requests to the host server. These requests are first sent to an FTP server which enforces security measures. Upon authentication, the FTP server issues appropriate commands and then passes these commands on to the operation system of the host server through an FTP transfer. The commands perform standard features of the operation system which are not normally allowable by traditional FTP. Responses are sent back through the FTP server to the original requestor's remote client computer. Error handling, security features, and/or access controls optionally reside on top of this command-and-control request and response mechanism. Furthermore, a log file can be created to record the transactions made during each session.

In another embodiment of the present invention, a web-based management application is designed to provide an intuitive, user-friendly graphical user interface to be operated in conjunction with a web browser on the local client computer. The user submits requests through this web control panel to initiate operations to be executed on the remote operating system of the host server. These HTTP web requests are initially transmitted to a web server which processes the HTTP requests and then submits the requests to the FTP server by establishing an IP connection. The FTP server handles the requests as described in the above embodiment. Likewise, responses sent back through the FTP server are passed on to the web server and reported to the user through HTML over HTTP to the original user's web browser for display.

In yet another embodiment, by virtue of using FTP as the connection to the remote server, the present invention can be used in conjunction with remote distribution services which rely on FTP as their upload/download processes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for remote computer systems management through an FTP Internet connection is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 2:
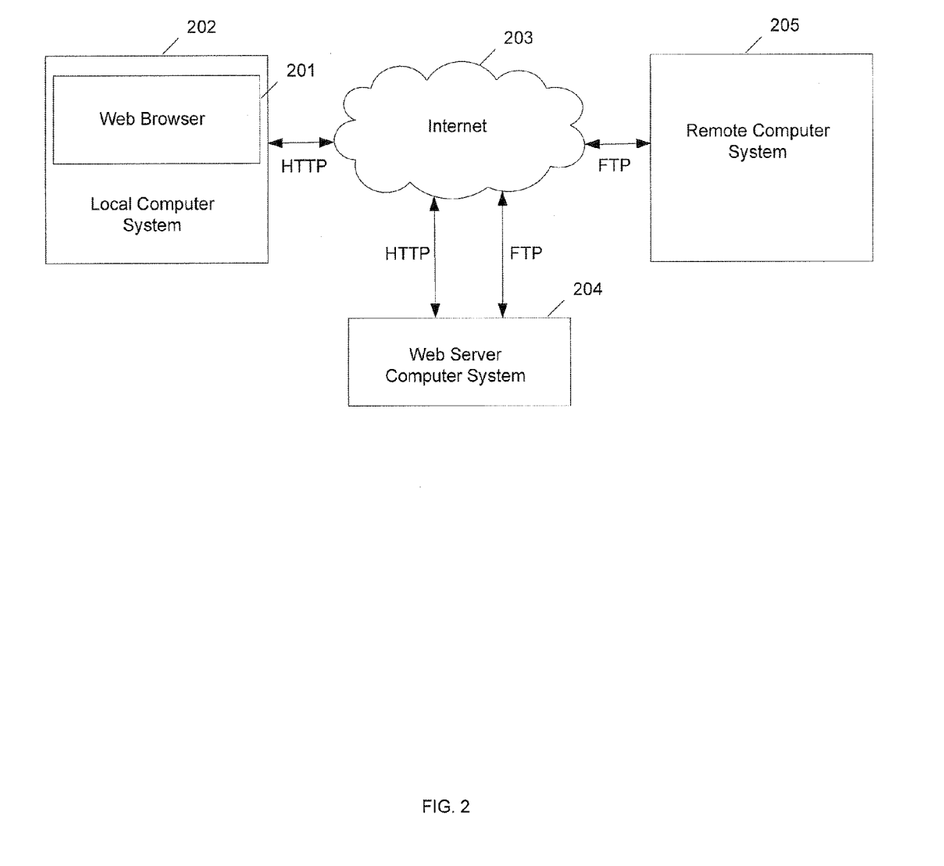
FIG. 2 shows an exemplary block diagram describing the operation of the currently preferred embodiment of the present invention.

In the currently preferred embodiment of the present invention, a user can submit requests to administer a remote computer system through a World Wide Web browser. FIG. 2 shows an exemplary block diagram describing the operation of the currently preferred embodiment of the present invention. A Web-based management application is operated by a user with a Web browser 201 on the user's local computer system 202. The user can issue requests to perform certain administrative tasks on a remote computer system 205 by entering the requests through Web browser 201. By utilizing a web browser, a user can administer any remote system (e.g., a UNIX server) from any web-enabled platform or operating system, without requiring the user have direct access to, or knowledge of, the remote system or its obscure software scheme, hardware configuration, or architecture. These requests are sent over Internet 203 as HTTP to a Web server computer system 204. Web server computer system 204 processes the requests and submits corresponding commands to the remote computer system 205 through FTP over the Internet 203. These commands are accepted and authenticated by the remote computer system 205 and then executed upon by its operating system (O/S). The remote computer operating system can be any form of operating system, including embedded operating systems (e.g., Cisco IOS) or a general purpose operating system (e.g., UNIX, NT, LINUX, Solaris, etc.). The commands initiate standard functions of the operating system which are not normally available through traditional FTP. Some exemplary commands include, but are not limited to, file and directory creation, change and edit files, remove files, Unix file mode, user and group ownership changes (for security/access permissions), and other standard system-level commands. Responses from remote computer system 205 are sent to the Web server computer system 204 as FTP over Internet 203. Web server computer system 204 forwards the responses back to the local computer system 202 as HTTP over Internet 203. The responses are displayed as HTML (Hypertext Markup Language) on Web browser 201. Error handling, security, and access controls can optionally be placed on top of this command-and-control request/response mechanism described above.

Furthermore, it should be noted that a direct connection can be established between any of the computer systems rather than an I/P (Internet Protocol) connection via the Internet. It should also be noted that the present invention is not limited to solely administering a remote computer system per se. Any type of computing, telecommunications, processing, or electronic device may be managed in this function. Some examples include concentrators, switches, routers, generators, etc. Basically, anything which runs software can be administered according to the present invention.

Figure 3:
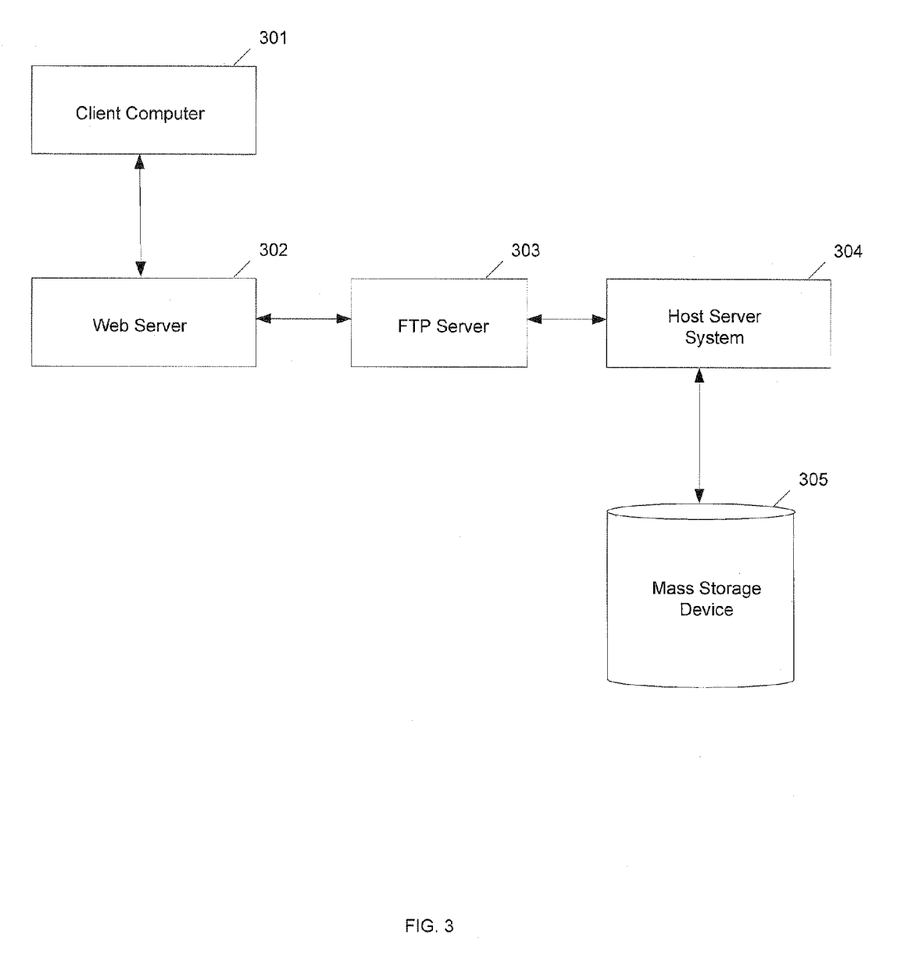
FIG. 3 shows a block diagram of an exemplary set of hardware which can be used to implement the present invention.

FIG. 3 shows a block diagram of an exemplary set of hardware which can be used to implement the present invention. A client computer 301 can be a personal computer (PC), portable computer, or some type of desktop computer. The client computer 301 issues HTTP requests to a Web server 302. Web server 302 processes the HTTP requests from client computer 301 and issues FTP commands to an FTP server 303. The FTP server 303 verifies and then forwards these FTP commands to the host server system 304. The operating system of host server system acts upon these commands and typically sends an FTP response back to the FTP server 303. The FTP server forwards the response to the Web server 302 which converts the FTP response into a HTTP response before forwarding it on to client computer 301. The Web server 302, FTP server 303, and Host server 304 can be one or more powerful PC's, workstations, server computers, mainframes, etc. Coupled to the host server system is a mass storage device 305 (e.g., disk array) for storing files, Web sites, documents, programs, and other types of data.

Figure 4:
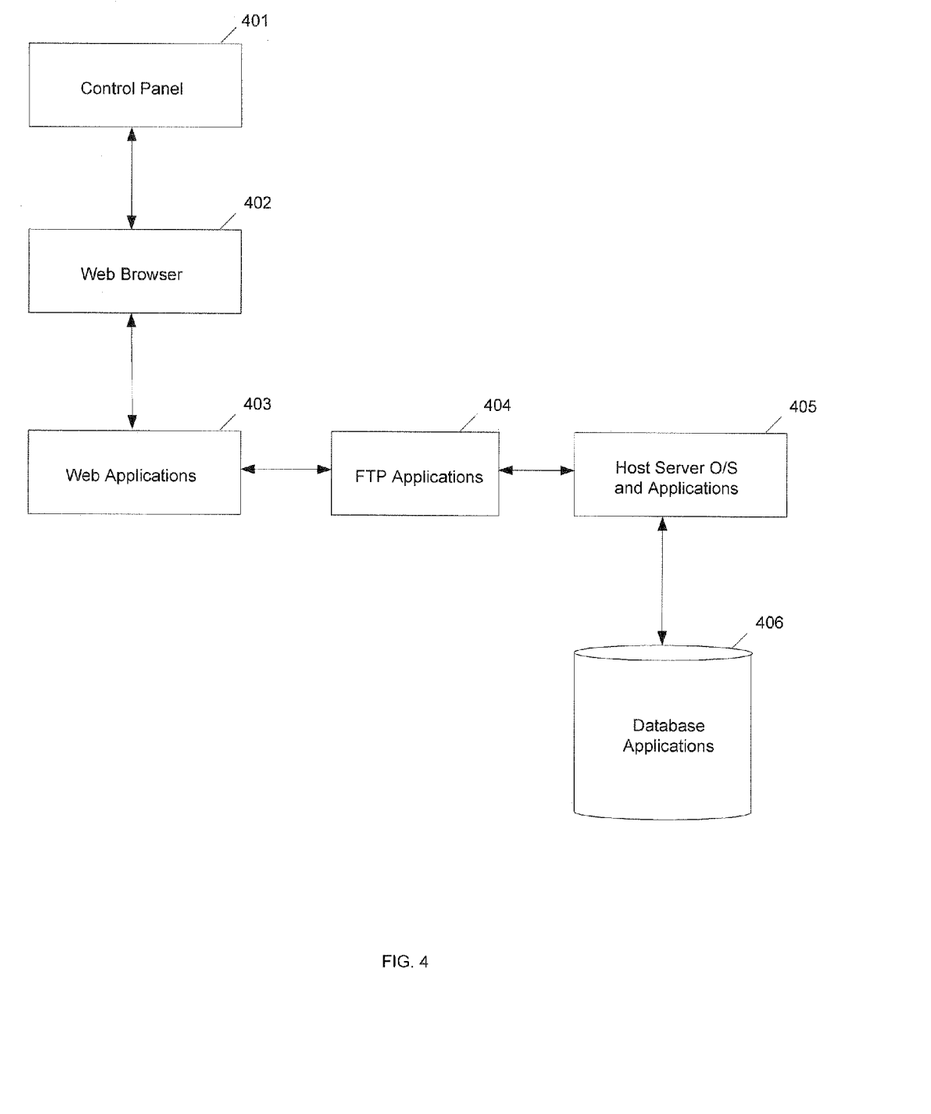
FIG. 4 shows a diagram of a set of exemplary software blocks for practicing the present invention.

FIG. 4 shows a diagram of a set of exemplary software blocks for practicing the present invention. A control panel 401 is useful to provide an easy-to-use graphical user interface (GUI) for aiding a user to enter requests to administer the remote computer system and understand any responses or acknowledgments returned from the remote computer system. The control panel can work as part of or communicate with a web browser 402 via HTML. By implementing a control panel or equivalent GUI, a user can make selections for normally command line interface systems administration calls from a web-based GUI. Web browser 402 transmits the requests as HTML to be processed by web applications 403. The requests are then translated into FTP commands recognizable by FTP applications 404. The FTP commands affect changes to be executed upon by the operation system and/or applications 405 residing on the host server. Some of the commands may effect the creation, deletion, edit, or access of the files and data via database applications 406.

Thereby, with the present invention, certain designated on-the-box system administration privileges are extended to users and content providers operating on client computers. This grants end users the ability to perform nearly all of the administrative tasks requisite to establishing, running, and managing a file system on the remote server system. Consequently, this administrative overhead is removed from the party responsible for managing remote server system. A trusted central server can be more easily allowed to login to perform the common operating system functions. At the same time, security is not compromised because the end users are denied operating system level log-ins. By limiting the number of O/S level accounts, the security risks are correspondingly reduced. Rather than setting up an account for each user on the server, assigning a user name and password for each account, having the users Telnet into the remote system, and then granting O/S level control to the users, the present invention has only one generic entry per server. This generic entry is assigned to multiple users, and these users do not even get a password. Essentially, a generic "virtual" user takes actions on behalf of all the real users. Turning off the other IP services and ports allows greater security administration to the box or allows the remote service to be more easily deployed through firewalls, as controls to the server are carried across the same IP port as the content upload. Moreover, security can be administered from the central server system, allowing the user to potentially manage multiple remote servers from a central web-based control point. In addition, server administration managed at the central site means that remote systems do not require user account-level administration or security permissions to be established.

Figure 5:
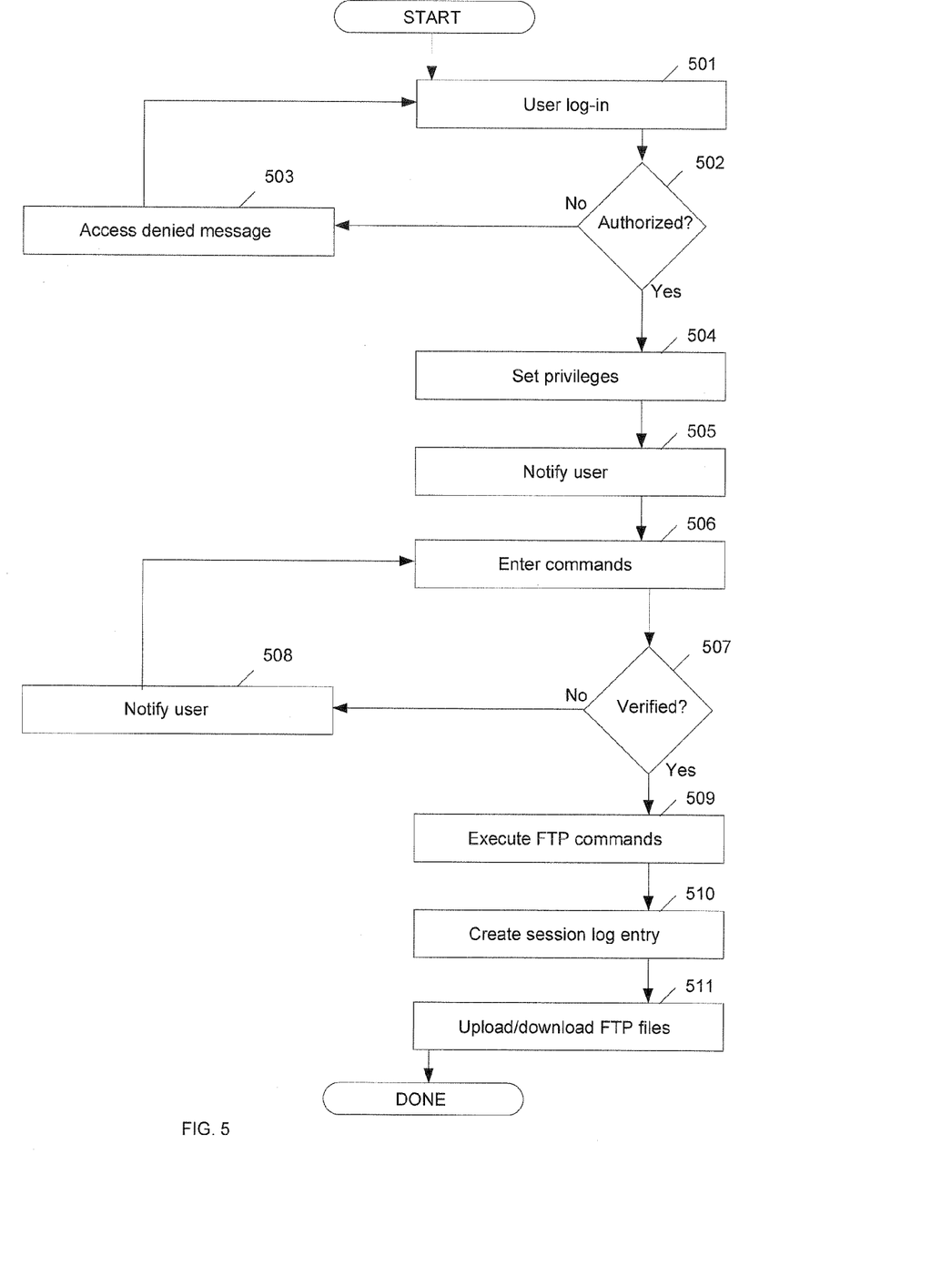
FIG. 5 shows a flowchart depicting the steps of one way in which the present invention may be used.

FIG. 5 shows a flowchart depicting the steps of one way in which the present invention may be used. First, a user logs in through his or her local client computer system's control panel, step 501. Note that users can be granted access controls to the Web-based central server separately. The HTTP log-in request is sent to a web browser which acts as an entitlement hook into an FTP server. The FTP server communicates with the UNIX database manager (DBM) or LDAP to determine whether that particular user is authorized to proceed, step 502. If the user is not authorized, a message is sent back to the user for display on the client computer and authorization is denied, step 503. If the user is legitimate, the log-in is accepted. Note that in either case, there is no TELNET or O/S level log-in. Next, the privilege level granted to the user is established in step 504. Once the privilege is established, a message is sent to the user informing the user that he or she is authorized to proceed, step 505. Thereupon, the user can initiate certain commands by entering them via the control panel, step 506. These commands are accepted through the FTP server and a security check is performed on the commands, step 507. If the user does not have the requisite privilege level for that particular command, a notification is sent to the user and the command is prevented from completing, step 508. Otherwise, the FTP command is executed, step 509. It should be noted that using FTP as the connection to the remote system also means that even systems (e.g., servers) without Web-based (HTTP) or TELNET-based access can be administered using this system. Furthermore, by offering HTTP and FTP capabilities, the present invention confers extensibility to legacy systems.

Optionally, a log can be created to store all the transactions made during that session by creating a session log entry, step 510. Thereby, the system administrator has the ability to play back the log to undo certain transactions and basically rebuild the file system. This audit trail gives the system administrator a powerful management tool. Another optional step 511 entails using a single command line transaction to script the FTP server to prepare the server system for the upload of content and then proceed with the actual uploading of the content onto the remote server system, both in pre and post processing modes. The user can post commands to the web control panel which causes an HTTP web server to drive a script which, in turn, drives the FTP server. Thereby, with this embodiment, using FTP as the connection to the remote server means this can be used in conjunction with remote distribution services which rely on FTP as their upload process. Likewise, one or more scripts can be used to command the server to download files, software, data, etc., to another computer system. For example, a single script can be used to command the server to download a software program to a customer's computer system over the Internet. This same script can be used to also perform the actual FTP file download. Another example would be to use a script to update, patch, or configure software running on another system (e.g., a router, telecommunication equipment, etc). The update, patch, or configuration can be performed by someone remotely over the Internet rather than doing it on-site with shrink-wrapped, pre-packaged software. Consequently, tasks such as uploading, downloading, file posting, and directory administration can be scripted and controlled from a common central server command point. Furthermore, controls can be intermessaged with file-based upload content delivery.

Figure 6:
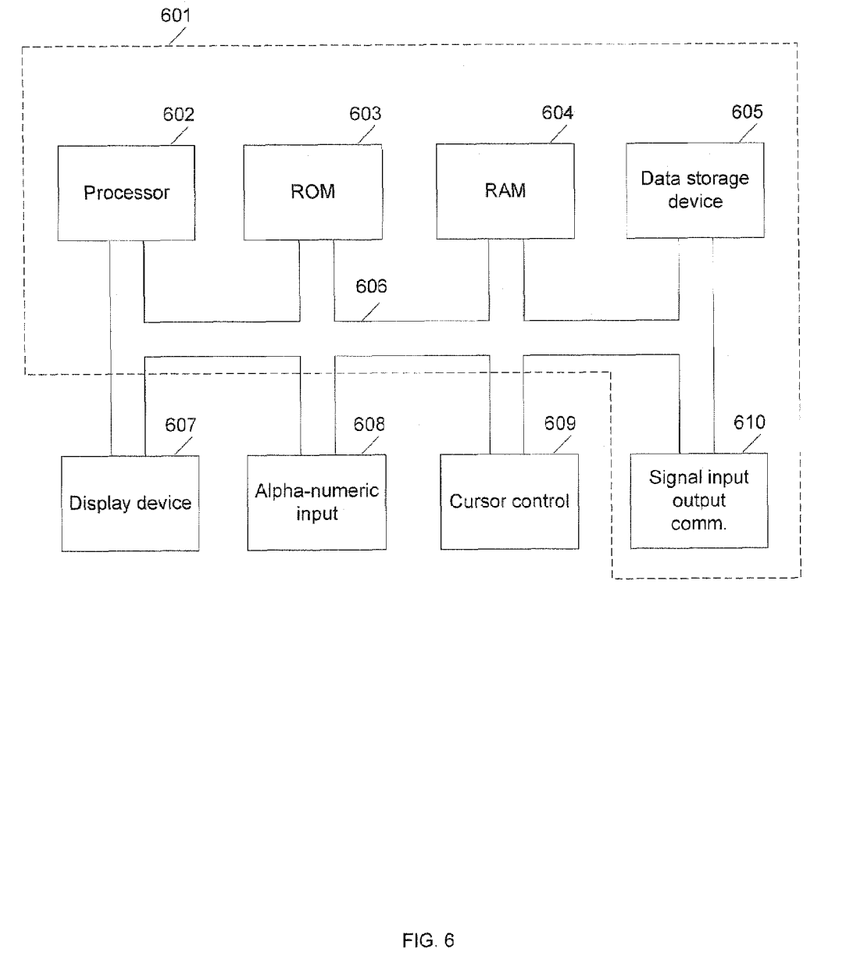
FIG. 6 shows an exemplary computer system upon which the present invention may be practiced.

FIG. 6 shows an exemplary computer system upon which the present invention may be practiced. System 601 can include any computer controlled graphics systems for generating complex or three-dimensional images. Computer system 601 comprises a bus or other communication means 606 for communicating information, and a processing means 602 coupled with bus 606 for processing information. System 601 further comprises a random access memory (RAM) or other dynamic storage device 604 (referred to as main memory), coupled to bus 606 for storing information and instructions to be executed by processor 602. Main memory 604 also may be used for storing temporary variables or other intermediate information during execution of instructions by processor 602. Data storage device 605 is coupled to bus 606 for storing information and instructions. Furthermore, an I/O device 610 is used for couple the computer system 601 onto a network.

Computer system 601 can also be coupled via bus 606 to an alphanumeric input device 608, including alphanumeric and other keys, is typically coupled to bus 606 for communicating information and command selections to processor 602. Another type of user input device is cursor control 609, such as a mouse, a trackball, or cursor direction keys for communicating direction information and command selections to processor 602 and for controlling cursor movement on display 607. This input device typically has two degrees of freedom in two axes, a first axis (e.g., x) and a second axis (e.g., y), which allows the device to specify positions in a plane. It should be noted that the present invention may be implemented as a computer program running on a computer system 601. Alternatively, the present invention may be embodied as a computer program stored on a computer-readable medium, such as RAM 604 or data storage device 605 (e.g., hard disk, floppy disk, etc.).

Thus, a method for remote computer systems management through an FTP Internet connection is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method, comprising:
   determining at a local server whether a user is authorized to access a remote server;
   when the user is authorized, identifying at the local server a first privilege level associated with the user, the identified first privilege level defining how the user is permitted to control an Operating System (OS) installed on the remote server;
   logging the local server onto the OS, the logon using a generic account that provides the local server a second different privilege level for accessing the OS on the remote server, the generic account being non-corresponding with the identified first privilege level, wherein the generic account does not restrict privileges according to the identified first privilege level and the local server imposes administrative privilege level restrictions on the user, and the generic account allows multiple users access to the remote server through a single account logon;
   receiving at the local server one or more commands entered through a web browser associated with the user, wherein the commands are configured to allow the user to administer the remote server through the web browser without requiring direct access to the remote server, and wherein the commands are configured to establish, run and manage files on the OS;
   filtering the commands received at the local server according to a verification of whether the received commands correspond to the identified first privilege level for the user;
   sending messages that represent the filtered commands from the local server, over a packet switched network, and to the remote server when the filtered commands correspond to the identified first privilege level;
   wherein at least one of the received commands is blocked through the filtering by the local server, the blocked command being one that is permissible under the second privilege level such that said filtering and sending by the local server simulates user OS logon using a user account having the identified first privilege level while the local server is actually logged onto, and accessing, the remote server using the generic account having the second privilege level; and
   creating a session log identifying the commands represented by the messages, the session log containing information to allow a system administrator to undo transactions performed on the OS, wherein the transactions alter a file system stored on the remote server and the session log contains information to allow the system administrator to rebuild the file system.

2. The method of claim 1 wherein said logon is conducted using an operating system level account that is selected independently of the user.

3. The method of claim 1 wherein the messages are sent using a transfer protocol that operates independently of HyperText Transfer Protocol (HTTP) capability on the remote server and that operates independently of TELecommunications NETwork (TELNET) capability on the remote server.

4. The method of claim 1 wherein the messages are configured to cause the remote server to download files to a client system separate from the remote server.

5. The method of claim 4 wherein the client system is a same client system that originates the commands.

6. A local server, comprising:
   one or more processors; and
   a memory coupled to the processors comprising instructions executable by the processors the processors operable when executing the instructions to:
   determine whether a user is authorized to access a remote server;
   when the user is authorized, identify a first privilege level associated with the user, the identified first privilege level defining how the user is permitted to control an Operating System (OS) installed on the remote server;
   log the local server onto the OS, the logon using a generic account that provides the local server a second different privilege level for accessing the OS on the remote server, the generic account being non-corresponding with the identified first privilege level, wherein the generic account does not restrict privileges according to the identified first privilege level and the local server is configured to impose administrative privilege level restrictions on the user, and the generic account allows multiple users access to the remote server through a single account logon;
   receive one or more commands entered through a web browser associated with the user, wherein the commands are configured to allow the user to administer the remote server through the web browser without requiring direct access to the remote server, and wherein the commands are configured to establish, run and manage files on the OS;

filter the received commands according to a verification of whether the received commands correspond to the identified first privilege level for the user;

send messages that represent the filtered commands from the local server, over a packet switched network, and to the remote server when the filtered commands correspond to the identified first privilege level;

wherein at least one of the received commands is blocked through the filtering by the local server, the blocked command being one that is permissible under the second privilege level such that said filtering and sending by the local server simulates user OS logon using a user account having the identified first privilege level while the local server is actually logged onto, and accessing, the remote server using the generic account having the second privilege level; and create a session log identifying the commands represented by the messages, the session log containing information to allow a system administrator to undo transactions performed on the OS, wherein the transactions alter a file system stored on the remote server and the session log contains information to allow the system administrator to rebuild the file system.

7. The local server of claim 6 wherein the local server is configured to remain logged onto the remote server under the generic account when forwarding the filtered commands for other users.

8. The local server of claim 6 wherein the commands are formatted as HyperText Transfer Protocol (HTTP) requests, and the local server is configured to send the messages using an File Transfer Protocol (FTP) format.

9. The local server of claim 6, wherein the processors are further operable to:

send a notification to the user when one of the commands is filtered, the notification indicating that the user does not have a requisite level of administrative privileges to control the remote server using the filtered command.

10. The local server of claim 6 wherein the received commands are for creating files and directories, editing files and directories, or removing files and directories.

11. The local server of claim 6 wherein a file structure on the remote server is manipulated according to the messages.

12. The local server of claim 6 wherein the OS is an embedded OS.

* * * * *